United States Patent [19]

Wessling et al.

[11] Patent Number: 4,904,385
[45] Date of Patent: Feb. 27, 1990

[54] POROUS FILTER MEDIA AND MEMBRANE SUPPORT MEANS

[75] Inventors: Ritchie A. Wessling, Midland; Larry D. Yats, Clare; Alan F. Burmester, Midland, all of Mich. Charles F. Diehl, Baton Rouge

[73] Assignee: The Dow Chemical Company, Midland, Mich.

[21] Appl. No.: 196,176

[22] Filed: May 19, 1988

Related U.S. Application Data

[60] Division of Ser. No. 851,178, Apr. 14, 1986, Pat. No. 4,765,915, which is a continuation-in-part of Ser. No. 737,113, May 23, 1985, abandoned.

[51] Int. Cl.$^4$ ............................................. B01D 13/00
[52] U.S. Cl. .................................. 210/490; 210/496; 210/510.1; 264/41
[58] Field of Search ............... 264/41; 210/496, 510.1, 210/490

[56] References Cited

U.S. PATENT DOCUMENTS 4,666,763  5/1987  King et al. .................. 264/112 X
4,765,915  8/1988  Diehl .............................. 210/496 X Primary Examiner—Frank Spear
Attorney, Agent, or Firm—Dan R. Howard; Thomas A. Ladd

[57] ABSTRACT

A method for filtering liquid or gaseous materials where the filtration is conducted with a porous filter media prepared from an aqueous wet-laid, lofted fiber-reinforced composite sheet, the composite sheet comprising a heat fusible polymer, reinforcing fibers and a binder. The random fiber composite sheet can be selectively lofted or recompressed to form filter media having variable porosity. Also, a membrane support means prepared by applying or treating the fiber-reinforced composite sheet with a discriminating membrane layer.

14 Claims, No Drawings

4,904,385

POROUS FILTER MEDIA AND MEMBRANE SUPPORT MEANS

CROSS-REFERENCE TO RELATED PATENT APPLICATIONS

This is a divisional of application Ser. No. 851,178 filed Apr. 14, 1986, now U.S. Pat. No. 4,765,915, which is a continuation-in-part of application Ser. No. 737,113, filed May 23, 1985, now abandoned.

BACKGROUND OF THE INVENTION

In one aspect, the present invention is directed toward a method for filtering various materials with a porous filter media prepared from a random fiber composite sheet.

It is desirable to prepare filters or membrane supports having good physical strength and varying porosity. This is, however, difficult with most of the known methods for preparing filters and filter materials. Examples of known filters are sintered glass, fritted metal, woven or leached polyolefins and paper.

Polymeric composites containing reinforcement means are known in the art and methods for their preparation are disclosed in U.S. Pat. No. 4,426,470. Generally, this method employs an aqueous wet-laid technique to prepare a composite comprising a thermoformable polymer, reinforcing fibers and a binder such as latex. The composite so prepared exhibits good physical properties having a combination of high flexural strength and compaction resistance. Also, the composite can be molded into a variety of shapes. It has now been discovered that such composites can be controllably lofted into porous materials to yield a wide range of porosity, particularly adaptable for filter media and membrane supports.

SUMMARY OF THE INVENTION

The present invention in one aspect is a method for filtering fluids, whether liquid or gaseous materials. The filtration is conducted by passing the fluid containing filterable material through a porous filter media comprising a lofted fiber-reinforced composite sheet. The composite sheet is prepared by an aqueous wet-laid process and comprises a heat fusible polymer, reinforcing fibers and a binder. The subject porous filter media can be selectively lofted to form a porosity gradient.

The heat fusible polymer, fibers and binder operably can be those operable in the process of U.S. Pat. No. 4,426,470.

The present invention in another aspect provides a process for preparing a porous filter media comprising the steps of heating a dried, wet-laid, densified, fiber-reinforced composite sheet to form the lofted composite sheet, thermoforming the lofted sheet into complex shapes and recompressing the lofted sheet to a desired porosity or bulk density.

In another aspect, the present invention is directed toward a membrane support means prepared from a random fiber composite sheet. The membrane support serves to give the necessary physical strength to a discriminating layer affixed to the support. Generally, the porous filters or membrane support means are prepared by wet-laid aqueous technique and subsequently lofted to provide a varying degree of porosity. "Lofted" is used herein to describe an expanded physical state of the random fiber composite after being heat treated.

The present invention further provides for a method for preparing the membrane support means. The method comprises applying a discriminating layer to at least one major surface of a fiber-reinforced composite sheet prepared by an aqueous wet-laid process. The application or formation of the discriminating layer can occur either before or after the fiber-reinforced composite sheet is lofted to a predetermined degree of porosity by a heat treatment step. The discriminating layer can comprise various polymeric films, preferably, a polydimethylsiloxane or a poly-4-methylpentene-1, a polycarbonate or a polyestercarbonate.

The porous filter media or membrane support formed in accordance with the present invention offers the advantages of being formable into many complex shapes and offering a high degree of physical strength heretobefore not possible. The physical strength of the subject porous media is made possible by the random fiber reinforcement means incorporated into the densified sheet prior to lofting.

DETAILED DESCRIPTION OF THE INVENTION

The subject porous filter media or membrane support is prepared from a lofted fiber-reinforced composite sheet. The fiber-reinforced composite sheet is conveniently prepared by the aqueous wet-laid technique as disclosed in U.S. Pat. No. 4,426,470, herein incorporated by reference. In particular, U.S. Pat. No. 4,426,470 discloses a predensified sheet which is pressed with a calender or niproll after drying the composite to provide a sheet having increased tensile and tear strength. Other forms of densified composite sheet are applicable to this method and are disclosed in the art as polymeric composites, fiber-reinforced polymeric sheets (U.S. Pat. No. 4,431,696), plastic composites, random fiber composites and fiber mats.

Preferably, the random fiber composite sheet is prepared by an aqueous slurry process to assure that the reinforcing fibers are uniformly dispersed throughout the resinous mixture. Also, this assures that the reinforcing fibers are randomly oriented in a plane defined by the composite sheet. This uniform but random orientation is necessary so that the reinforcing fibers have significant overlap in the sheet such that deformational energy is stored by the fibers. Upon heating, this energy is released whereby the sheet will expand or loft in a direction normal to the plane of the sheet.

The aqueous slurry process or aqueous wet-laid method for preparing the composite sheet is disclosed in U.S. Pat. No. 4,426,470. Generally, a dilute aqueous slurry is prepared containing a plurality of reinforcing fibers, at least one heat fusible polymer and a binder. The resulting product is uniformly distributed onto a porous support and allowed to drain to form a wet mat. The wet mat is optionally passed through press rolls and then is dried. The dried mat may then be subjected to various treatments such as densification.

The density of the particular sheet prior to preparation of the filter media or membrane support will depend on the individual thermoplastic resins and reinforcing fibers employed. A typical densified random fiber composite sheet containing a polyolefin matrix and glass fibers would have a density from about 0.75–1.75 g/cc preferably, 0.9–1.30 g/cc.

In general, the random fiber composite sheet will comprise a heat fusible resin into which a reinforcing fiber can be incorporated. In addition, the composite may contain other additives or adjuvants, such as, cellulose, latex binders, inorganic pigments, antioxidants, flocculants, and other ingredients appropriate for filter media or membrane supports.

A major ingredient for the preparation of the filter media is the reinforcement fibers. Generally, the reinforcement fibers are described as being either organic or inorganic products such as graphite, metal, ceramic, polyamides, aromatic polymers, polyesters, cellulose and glass. Glass fibers are the preferred choice for most applications due to their strength and low cost. However, the requirements of specific applications may make other fibers more suitable. The particular compositional identity of the fiber is not deemed to be critical to the subject method and the skilled artisan may find any number of fibers to perform equally well. The fiber should have a higher heat distortion or softening temperature than the heat fusible polymer present.

The reinforcing fibers are essentially uniformly dispersed throughout the resinous matrix and are randomly oriented in a plane defined by the composite. Preferably, there is substantially no alignment of the fibers in any particular direction within said plane. The fibers employed have an average length of from about 0.125 to about 1.00 inch (3–25 mm), preferably from about 0.18 to about 0.5 inch (4–12 mm). Additionally, the fibers have a minimum aspect ratio (i.e., ratio of length to diameter) of at least about 40 more preferably at least about 100. Generally, the reinforcement fiber comprises from about 10 to about 80 percent by weight of the composite sheet, preferably, from about 15 to about 40 percent by weight of the composite sheet.

The heat fusible polymers employed in the composite sheet are those polymer particles which are capable of deformation under heat and/or pressure to join into a unitary structure. These fusible polymers can be either thermoplastic or thermoset resins. The fusible organic polymer component is desirably a hydrophobic water-insoluble polymer. These polymers may be in the form of either powders or dispersions. Illustrative fusible organic polymers include polyethylene, chlorinated polyethylene, high density polyethylene, polycarbonates, nylon, polysulfone, polyether sulfone, aromatic polyester and styrene homopolymers and copolymers. Other suitable fusible organic polymers are disclosed in U.S. Pat. No. 4,426,470. Preferred polymers are engineering thermoplastics, such as a polyphenylene sulfide, a polyamide, a polyarylene oxide (e.g., poly-2,6-dimethylphenylene oxide) or a polyaryleneetheretherketone. The polymers are generally employed in an amount from about 19 to about 79 percent by weight of the solids, dry weight basis.

The heat fusible polymer in one preferred embodiment has a heat distortion temperature greater than about 100° C., as determined in accordance with the ASTM (American Society for Testing Materials) standard method. Preferably, the polymer in a membrane support is a crystalline or thermosetting polymer with high resistance to both compaction an stress cracking and good resistance to chemical attack from chlorine and other materials the membrane may contact.

A third component of the composite sheet is the binder. The binder is used as an agent to promote cohesion of the materials formed into the random fiber composite sheet. Typically, the binders are starch, synthetic polymers and natural polymers. One such binder is a latex comprising an aqueous colloidal dispersion of substantially water-insoluble organic polymers having anionic or cationic bound charges in an amount sufficient to provide stabilization of the colloid but insufficient to cause the polymer to be water-soluble. Further disclosure as to the binder is found in U.S. Pat. No. 4,426,470, which is incorporated herein by reference. Another binder system is described in U.S. Pat. No. 4,550,131, which is incorporated herein by reference.

Where necessary, a polymeric flocculant opposite in charge to the charged binder can be employed. However, other means of destabilizing the slurry can be employed which are suitable for the particular binder utilized. Examples of suitable flocculants include partially hydrolyzed polyacrylamide for cationic systems, and modified cationic polyacrylamide and diallyldiethylamonium chloride for anionic systems.

Additionally, the composite sheet can comprise a variety of other ingredients such as UV stabilizers, antioxidants, bactericides or colorants. Optionally, the addition of the low level of synthetic polymeric fibers, also called polyolefin paste or pulp, may be desirable. Polymeric fibers have been found to be advantageous in the preparation of polymeric composites. For example, polyaramide pulp additives are generally disclosed in French Patent Publication No. 2,507,123-A as contributing to the cohesive properties of the composite. Other typical polymeric fibers are polyethylene, polypropylene, polyvinyl chloride, polyester, polystyrene and ABS (acrylonitrile/butyldiene/styrene copolymer). Generally, the polymeric fibers are present from about 1 to about 10, preferably from about 3 to about 5 weight percent based on total solids.

The subject porous filter media is formed from the fiber-reinforced composite sheet by heating the sheet, which causes it to expand or loft. 'Loft' is a term employed to indicate that the fiber-reinforced composite sheet has been expanded to create a porous structure of variable degree. Physically, lofting is where the fiber-reinforced composite sheet is subjected to heat which softens the heat fusible polymer and allows the reinforcing fibers to relax. The reinforcing fibers are initially placed under stress during the preparation of the densified composite sheet which causes the fibers to bend slightly where they overlap. The strained fibers have a tendency to return to their undeformed state when the polymeric matrix is softened.

The lofting of the fiber-reinforced sheet can result in a sheet having a void volume of from about 20 to about 90 percent of the original volume of the sheet. This void volume can be adjusted by the amount of heat employed (intensity and time) and conditions under which the sheet is expanded or lofted, i.e., physical constraining means. This void volume of the lofted sheet corresponds to approximately an expansion of at least about 20 percent in thickness of the fiber-reinforced sheet with a corresponding reduction in density relative to the densified composite. Increases in thickness of up to about 500 percent can be obtained by lofting.

Lofting can be induced by any heat treatment means sufficient to soften the polymeric matrix to allow the reinforcing fibers to expand the sheet. Of course, the temperature required for lofting will depend upon the heat distortion temperature of the polymer. Such heating means are, for example, oven, infrared radiation, hot impinging air or microwave. In one aspect, the reinforced composite sheet can be uniformly lofted to form a filter media having consistent porosity throughout. In another aspect, heat can be selectively applied to only a small portion of the reinforced composite sheet to only loft and thereby provide porosity to that one portion. In yet another aspect, a porosity gradient can be created in the reinforced composite sheet. For example, by applying heat to only one side of the composite sheet, a porosity gradient would be formed with the heated side having the greatest porosity and the unheated side having the least porosity. The asymmetric porous sheet can serve as a selectively permeable membrane when the major surface not heated remains continuous or is less porous than the heated side. A continuous surface can function as a discriminating layer, i.e., a layer which exhibits selective permeability to certain components of a mixture. A microporous surface may be size selective resulting in a composite which can be used as an ultrafiltration membrane.

One advantage provided by the utilization of the fiber-reinforced composite sheet to form filter media or membrane support means is that they have excellent tensile properties and strength which make them very desirable for use in heavy duty filter areas and as membrane supports. Typically, the porous filter media formed from the lofted sheet can have a density of from about 0.2 to about 1.20 g/cc and a variable thickness of from about 0.005-0.60 inch. The porous filter media and membrane support means so formed are generally applicable wherever other macroporous filter media are known to be used, for example, in the filtration of liquid or gaseous materials. Because of the integrity and physical strength of the porous filter media, other applications can be envisioned, such as for use as a catalyst bed, an ion exchange resin bed support means or support for other filtration means such as prefilters for reverse osmosis membranes.

Yet another advantage provided by the utilization of the fiber-reinforced composite sheet is to form membrane supports. A membrane discriminating layer can be applied to a lofted sheet of the fiber-reinforced composite to form a thin film composite membrane. Alternatively, the membrane discriminating layer can be applied to the densified fiber-reinforced composite sheet which is then lofted to a predetermined degree. The membrane discriminating layer can be applied to the support layer by any convenient means known in the prior art. The discriminating layer can be cast, coated or otherwise formed on the porous support layer. Alternatively, the discriminating layer can be formed separately and then laminated to or otherwise adhered to the support. The discriminating layer should preferably be applied to the denser major surface of the lofted sheet, if the porosity of all surfaces is not the same. The composite membrane thus formed has a fiber-reinforced porous support layer with a combination of high flexural strength and compaction resistance. The composite membrane is useful for pressure driven membrane processes including ultrafiltration, reverse osmosis, gas separation and aeration of liquids.

In one preferred embodiment of the invention, a porous or highly permeable coating is applied to at least one major surface of the random fiber composite. Because the discriminating layer is advantageously as thin as practical without development of discontinuities, it is desirable that the relatively uneven surface of the random fiber composite be covered by a porous or highly permeable layer having a smooth external surface to which the discriminating layer is applied. Preferred as coatings for gas separation membranes are materials having high gas permeabilities, such as cellulose ethers, 4-methyl-1-pentene polymers, polydialkylsiloxanes and silicone copolymers and substituted polyacetylenes. Preferred as coatings for reverse osmosis membranes are lightly crosslinked, water-swellable polymers, vinyl alcohol polymers or other materials having high water permeability.

The membrane discriminating layer can be prepared from any polymeric material used in the prior art. Illustrative polymers useful as discriminating layers are described in U.S. Patent 4,214,020 at Column 10, which is incorporated herein by reference. Preferred polymers for discriminating layers are 4-methylpentene-1 polymers, aromatic polyamides as described in U.S. Pat. No. 4,277,344, cellulose triacetate and other cellulose esters, polycarbonates, polysulfones, polyethersulfones and polyphenylene oxides. These polymers may operably bear compatible substituents. Especially preferred is the poly(phenylene diamine) discriminating layer prepared by interfacial polymerization as described in U.S. Pat. No. 4,277,344, which is incorporated herein by reference. The foregoing membranes and discriminating layers are representative only and are not to be construed as limitations upon the supported membranes which can be prepared.

EXAMPLE 1

Four filters were prepared from a lofted random fiber composite sheet and their filtration characteristics measured. A densified composite sheet having 56.4 percent high density polyethylene, 37 percent glass fibers (3/16 of an inch in length), 3.6 percent latex binder, and 3 percent polyethylene fibers was lofted to varying degrees. Disks of the lofted random fiber composite sheet were cut out with a die cutter and fitted into plastic Buchner funnels. The edges were sealed with an adhesive and allowed to cure. Solutions of magnesium silicate in water were then vacuum filtrated through the funnels and the percent retention of the magnesium silicate recorded. The particle size of the magnesium silicate was approximately 37 microns (400 mesh). The results of filtering the magnesium silicate through the 4 porous filters are recorded in Table I as follows:

TABLE I

| Sample | Thickness (Inches) | Density (g/cc) | Percent Retention Magnesium Silicate |
|---|---|---|---|
| 1 | .250 | 0.35 | 65 |
| 2 | .218 | 0.40 | 88 |
| 3 | .180 | 0.49 | 92 |
| 4 | .116 | 0.70 | 97 |

As can be seen from the data shown in Table I, porous filters of varying filtration properties were obtained from the same densified random fiber composite sheet by lofting the sheets to varying degrees of porosity. The sheet having the highest density (Sample 4, 0.70 g/cc density) recorded the maximum retention; whereas, sheets lofted to a more substantial degree, i.e., 0.35 g/cc density, exhibited lower percent retention of the magnesium silicate particulate. Therefore, Example 1 demonstrates the extreme flexibility and utility of utilizing lofted random fiber composite sheets to form porous filter media.

EXAMPLE 2

Three porous filter media were prepared from lofted random fiber composite sheet and their physical characteristics were measured. The composite sheet consisted of 58.4 percent high density polyethylene, 35 percent glass fibers (3/16 of an inch in length), 3.6 percent latex binder, and 3 percent polyethylene fibers. Various thicknesses of densified random fiber composite sheet (approximately 1.20 g/cc density) were lofted and recompressed to 0.125 inches to form varying degrees of porosity as measured by bulk density and the physical characteristics and pore size were calculated using a Micrometrics Auto-pore 9200 apparatus. Sample 1 was prepared from a 0.035 inch thickness of densified sheet and fully lofted to 0.125 inches in an infrared oven set at 190° C. for approximately 2.5 minutes. Sample 2 was prepared from a 0.042 inch thickness of densified sheet which was fully lofted as in Sample 1 and then recompressed in a mold at room temperature to 0.125 inches. Sample 3 was prepared from a 0.077 inch thickness of densified sheet, lofted and recompressed to 0.125 inches. The results for each sample are shown in Table II.

TABLE II

| Sample | Bulk Density (g/cc) | Percent Porosity | Pore Diameter Range (microns) | Medium Pore Size (microns) | Water Flow Rate @ 3 psi (gpm/in$^2$) |
| --- | --- | --- | --- | --- | --- |
| 1 | 0.36 | 71.7 | 26–235 | 73 | 0.95 |
| 2 | 0.43 | 62.4 | 20–235 | 69 | 0.46 |
| 3 | 0.79 | 35.6 | 1–235 | 39 | 0.01 |

The foregoing data demonstrates a densified random fiber composite sheet lofted to varying densities which corresponds to a varying degree of porosity. As can be seen, the percent porosity is inversely proportional to the bulk density of the lofted random fiber composite sheet.

EXAMPLE 3

A polymeric membrane on a porous composite support was prepared as follows: A fiber-reinforced composite sheet having a high density polyethylene polymeric matrix was densified by heating to 180° C. under 10 tons ram pressure for 2 minutes. The sheet was then cooled to 50° C. under pressure.

To one side of the densified sheet was applied a polymeric membrane material consisting of a 10 percent polycarbonate polymer solution in methylenechloride. The coated side of the sheet was placed against an unheated platen and the opposite side was placed against a heated platen. The temperature of the heated platen was raised to 150° C. for 10 minutes which lofted the sheet approximately 75 percent in thickness.

An identically prepared polymeric membrane coated on a densified fiber-reinforced composite sheet was lofted to approximately 90 percent in thickness by heating one side at 160° C. for 10 minutes.

EXAMPLE 4

A membrane support for a polymeric membrane was prepared by coating an 11 mils thick densified fiber-reinforced composite sheet with a 10 percent polycarbonate polymer solution in methylenechloride. The coated sheet was placed in a hot air oven (coated side up) and the temperature raised to 140° C. The sheets were visually observed and removed after lofting to approximately 40 mils in thickness. A fiber-reinforced porous membrane support with a polycarbonate membrane discriminating layer was formed.

In view of the foregoing demonstrations of how a densified random fiber composite sheet can be lofted to form porous filter media having a varying degree of porosity, it should be evident that the subject filters would have a broad range of applicability. For example, it is foreseen that the filter media formed, as per the subject disclosure, could be used as column chromatography supports, disk filters, aeration diffusion plates, membrane supports, ion exchange resin supports, fluid bed supports, air silencers, controlled release devices, biomedical filters, and the like. The porous filter media formed in accordance with this disclosure have the advantage of being engineered to any particular porosity desired within the constrains of the lofted random fiber composite sheet and provide a high degree of physical strength heretobefore not possible with traditional polymeric porous filter materials.

What is claimed is:

1. A method for preparing a composite membrane comprising the application or formation of a membrane discriminating layer on at least one major surface of a fiber-reinforced composite sheet and heating and expanding said fiber-reinforced composite sheet to obtain a predetermined degree of porosity either before or after application of the membrane discriminating layer.

2. The method of claim 1 where said fiber-reinforced composite sheet comprises a heat fusible polymer, reinforcing fibers and a binder.

3. The method of claim 2 where said reinforcing fibers are glass fibers from about 0.125 to 1.00 inch in length.

4. The method of claim 1 wherein on the fiber-reinforced composite sheet is formed a highly porous or permeable layer which provides a smooth surface on which the discriminating layer is formed.

5. The method of claim 1 where said heat treatment step is conducted by applying heat to one major surface of said fiber-reinforced composite sheet whereby a porosity gradient is formed in said sheet.

6. The method of claim 1 where said heat treatment step is conducted such that said fiber-reinforced composite sheet is uniformly heated.

7. The method of claim 1 where said membrane discriminating layer comprises poly(phenylene diamine trimesamide).

8. The method of claim 1 where said polymeric film is a polymer or copolymer of 4-methylpentene-1 or a polycarbonate.

9. A supported membrane comprising a membrane discriminating layer on at least one major surface of a lofted fiber-reinforced porous composite sheet.

10. The supported membrane as described in claim 9 wherein said composite sheet comprises a heat fusible polymer, reinforcing fibers and a binder.

11. The supported membrane as described in claim 10 wherein the heat-fusible polymer has a heat distortion temperature greater than 100° C.

12. The supported membrane as described in claim 11 wherein the heat fusible polymer is a polyphenylene sulfide, a polyarylene oxide, a polyetheretherketone or a polyamide.

13. The supported membrane as described in claim 12 wherein the membrane further comprises a highly porous or highly permeable layer between the discriminating layer and the lofted composite sheet.

14. The supported membrane as described in claim 13 wherein the highly permeable layer is a 4-methyl-1-pentene polymer, a cellulose ether, a polydialkylsiloxane, a silicone copolymer or a substituted polyacetylene.

* * * * *